United States Patent [19]
Luy et al.

[11] Patent Number: 5,632,102
[45] Date of Patent: May 27, 1997

[54] PROCESS AND APPARATUS FOR THE PRODUCTION AND/OR TREATMENT OF PARTICLES

[75] Inventors: Bernhard Luy, Sulzburg; Ulf Konig, Karlsruhe; Matthias Tondar, Hausen i. W., all of Germany

[73] Assignee: Glatt GmbH, Binzen, Germany

[21] Appl. No.: 422,538

[22] Filed: Apr. 14, 1995

[30] Foreign Application Priority Data

Nov. 14, 1994 [CH] Switzerland .................. 339/94

[51] Int. Cl.⁶ ........................................... F26B 17/00
[52] U.S. Cl. .............................. 34/582; 34/585; 34/372
[58] Field of Search ......................... 34/582, 585, 586, 34/588, 368, 369, 372

[56] References Cited

U.S. PATENT DOCUMENTS

| | | | |
|---|---|---|---|
| 2,067,666 | 8/1937 | Martin | 34/582 |
| 3,482,328 | 12/1969 | Larkham | 34/586 |
| 3,999,951 | 12/1976 | Bowers et al. | 34/585 |
| 4,621,437 | 11/1986 | Grande et al. | |
| 4,858,552 | 8/1989 | Glatt et al. | |
| 5,236,503 | 8/1993 | Jones | |
| 5,284,678 | 2/1994 | Hirschfeld et al. | |
| 5,478,173 | 12/1995 | Lenhart | 34/582 |
| 5,480,617 | 1/1996 | Uhlemann et al. | 34/582 |

FOREIGN PATENT DOCUMENTS

| | | |
|---|---|---|
| 622781 | 9/1990 | Australia. |
| 0 141 437 | 5/1985 | European Pat. Off.. |
| 0 388 867 | 9/1990 | European Pat. Off.. |

OTHER PUBLICATIONS

Drugs Made in Germany (Drugs Made in Germany 32, 2, 68–73 (1989) "Granulation and Drying in Vacuum Fluid Bed Systems".

*Primary Examiner*—John T. Kwon
*Attorney, Agent, or Firm*—Jacobson, Price, Holman & Stern, PLLC

[57] ABSTRACT

An apparatus for the production and/or treatment of particles has a gas circulation possessing a process chamber and a gas circulation device and at least one spray nozzle. The latter has a nozzle body with a liquid outlet and a gas passage surrounding the nozzle body at the liquid outlet and entering the process chamber. For the production and/or treatment of particles, the pressure in the gas circulation is reduced to a value below the ambient air pressure by a suction device and gas is circulated by the gas circulation device so that gas flows upward through the process chamber. In addition, a liquid is sprayed in the process chamber from time to time through the spray nozzle and at the same time gas is passed from a branch of the gas circulation to the gas passage of the spray nozzle and through the latter into the process chamber. This gas protects the spray nozzle from the adhesion of sprayed liquid without additional gas entering the gas circulation from outside.

32 Claims; 2 Drawing Sheets

PROCESS AND APPARATUS FOR THE PRODUCTION AND/OR TREATMENT OF PARTICLES

BACKGROUND OF THE INVENTION

1. Field of the invention

The invention relates to a process and an apparatus for the production and/or treatment of particles.

The process and the apparatus can be used, for example, for moving particles, introduced in the solid, dry or moist state into a process chamber, in gas passed upward through the process chamber, for example to fluidize said particles and/or to move said particles on a rotor, and to apply a coating to the particles by spraying a liquid in the process chamber and/or to agglomerate the particles originally present to give larger particles—i.e. to granulate said particles by pelletization—and to dry said particles. For example, the liquid may contain at least one organic solvent and/or dispersant and/or water serving as a solvent and/or dispersant, may consist of a solution and/or contain a disperse phase and serve as a coating material or binder. If particles to be agglomerated already contain a binder present in the solid state and soluble in a solvent, it may be sufficient to spray, as the liquid, merely the stated solvent onto the particles.

However it is also possible to form the solid particles in the process chamber itself. The liquid used for this purpose may be a solution which is atomized in the process chamber into droplets, from which the solid particles form after the drying process. These may then likewise be provided with a coating and/or agglomerated.

2. Description of the prior art

U.S. Pat. No. 4,621,437 discloses fluid bed apparatuses in which a process chamber serving to receive the particles, a gas circulation device and a heat exchanger together form a gas circulation. The gas circulation has a branch which is connected to a vacuum suction pump and a condenser for solvent recovery. The process chamber contains a spray nozzle which is connected via a pump to a liquid reservoir.

During operation of these apparatuses, the gas pressure in the gas circulation is reduced by means of the vacuum suction pump to a value below atmospheric pressure and gas is circulated in the gas circulation by means of the gas circulation device. The particles present in the process chamber are fluidized by means of the circulated gas, sprayed for a certain time with a liquid containing an organic solvent and then dried without spraying of liquid.

When the spray nozzles are used, only the liquid to be sprayed but neither air nor another gas is fed to the spray nozzles of the apparatuses disclosed in U.S. Pat. No. 4,621,437. These spray nozzles thus consist of airless high-pressure nozzles. When an airless high-pressure nozzle is used, especially with intermittent spraying of a liquid coating material or binder, there is however the danger that liquid droplets in the region of the liquid outlet of the spray nozzle will remain adhering to said nozzle and dry and/or that particles from the fluid bed will adhere to the nozzle. This may influence the atomizing properties of the spray nozzle in a disadvantageous manner so that, for example, many liquid droplets are substantially larger than intended. This results in local overmoistening of particles during the coating of particles and thus promotes agglomeration, which is generally undesirable. Moreover, the spray nozzle may even be completely blocked.

From other fluid bed processes in which the particles are fluidized with a gas at approximately normal ambient air pressure, it is known per se that the liquid to be applied to the particles can be sprayed using a multi-medium nozzle. In addition to the liquid whose pressure is approximately equal to the ambient air pressure, compressed air or another compressed gas having a pressure which is greater than that of the liquid and is usually about 200 kPa to 500 kPa is supplied to said spray nozzle.

If the gas transported through the process chamber for fluidizing the particles has a pressure substantially below atmospheric pressure and, for example, consists essentially of superheated vapor of at least one organic solvent, spraying a liquid with the aid of a conventional multi-medium nozzle by supplying compressed air or other compressed gas from an external compressed gas source would have the disadvantage that, during spraying, a large amount of air or of another gas—for example nitrogen—would pass from the compressed gas source into the process chamber. This in turn would have the disadvantage that the apparatus would have to be equipped with a relatively large and expensive vacuum suction pump which would require a great deal of energy during spraying of liquid, in order to maintain in the process chamber the desired pressure below the ambient air pressure. Another particular disadvantage would be that it would be necessary to provide a large, expensive solvent recovery apparatus consuming a great deal of energy during operation, in order to liquefy the solvent vapor in the gas extracted from the circulation by the suction pump by cooling said gas and to separate said liquid from the remaining gas and to collect said liquid. If a large amount of gas which contains, for example, air or nitrogen and organic solvent vapor is fed to the solvent recovery apparatus per unit time, it is furthermore difficult completely to avoid the emergence of organic solvent into the environment or at least to keep the emerging amount of solvent sufficiently low.

SUMMARY OF THE INVENTION

It is therefore the object of the invention to provide a process and an apparatus for the production and/or treatment of particles and to avoid disadvantages of the known processes and apparatuses. In particular, starting from the prior art disclosed in U.S. Pat. No. 4,621,437, it is intended to avoid disturbance of the spraying of liquid by material adhering to the spray nozzle or to at least one spray nozzle and hence the promotion of undesirable agglomeration, for example during coating of particles, or to avoid complete blockage of the spray nozzle or of at least one spray nozzle. This object is to be achieved without substantially increasing the apparatus and the energy consumption for maintaining a desired pressure in the process chamber which is below the ambient air pressure and for the recovery of the or each organic solvent and/or dispersant present in the gas withdrawn from the gas circulation.

The object of the invention is achieved by a process for the production and/or treatment of particles, wherein gas whose pressure in the process chamber is below the ambient air pressure is circulated in a gas circulation having a process chamber and a gas circulation apparatus, wherein, during circulation of gas, a liquid is fed to at least one spray nozzle from time to time and is sprayed into the process chamber through a liquid outlet present in a mouthpiece of the spray nozzle in order to form and/or to treat the particles in the process chamber, and wherein, at least during spraying of liquid, gas is passed from the gas circulation to a gas passage of the spray nozzle and is passed into the process chamber through a section of the gas passage which in cross-section surrounds the mouthpiece of said spray nozzle at the liquid outlet.

Another object of the invention is achieved by an apparatus for the production and/or treatment of particles, having a process chamber for receiving the particles, having a gas circulation device forming a gas circulation together with the process chamber in order to circulate gas through the gas circulation and the process chamber, having a suction device connected to the gas circulation in order to extract gas from the gas circulation and to generate in the process chamber a gas pressure below the ambient air pressure, and having at least one spray nozzle which serves for spraying a liquid into the process chamber and possesses a mouthpiece and a liquid passage with a liquid outlet bounded by the mouthpiece, wherein the spray nozzle has a gas passage with a section which in cross-section surrounds the mouthpiece at the liquid outlet and wherein means are present for passing the gas from the gas circulation to the gas passage of the spray nozzle and through the latter into the process chamber.

In the process according to the invention, gas whose pressure in the process chamber and preferably in the entire gas circulation is below the ambient air pressure or atmospheric pressure is thus circulated in the gas circulation. The pressure of the gas present in the process chamber and in the remaining gas circulation is expediently at most 80 kPa, preferably at most 50 kPa, for example at most 30 kPa and for example at least 5 kPa or at least 10 kPa, from the beginning of the circulation of gas or at the latest from the beginning of the spraying of liquids up to the end of the circulation of gas.

According to the invention, gas is passed from the gas circulation to the gas passage of the spray nozzle and through a section of the gas passage of the spray nozzle, which section in cross-section surrounds the mouthpiece of said spray nozzle at the liquid outlet, into the process chamber. When the process parameters are expediently established, this gas forms a gas envelope more or less surrounding in cross-section the liquid flowing out of the liquid outlet, and prevents liquid droplets in the region of the liquid outlet from coming into contact with the spray nozzle. Furthermore, the gas flowing from the spray nozzle into the process chamber prevents particles present in the process chamber from accumulating on the spray nozzle in the vicinity of the liquid outlet of the spray nozzle. The invention therefore completely or at least substantially prevents the atomization properties of the spray nozzle from being adversely affected by material accumulating in the liquid outlet or on the spray nozzle close to said outlet or even from blocking the spray nozzle. Maintaining the atomization properties—such as, for example, the sizes of the liquid droplets formed—during prolonged and/or intermittent spraying of liquid helps to ensure a good quality of the products prepared and reduces the danger of undesirable agglomeration, particularly during coating of particles.

Since the gas fed to the spray nozzle originates from the gas circulation, it does not increase the total amount of gas present in the gas circulation. Accordingly, this gas also does not give rise to additional cost for the apparatus and the energy which are required for maintaining in the gas circulation a desired pressure below the ambient air pressure or atmospheric pressure and for recovering, i.e. liquefying and collecting, the or each organic solvent and/or dispersant which may be present in the gas withdrawn from the gas circulation.

The liquid to be sprayed can be fed to the spray nozzle at a pressure which is preferably at least 500 kPa, preferably at least 1 MPa, preferably at most 10 MPa and, for example, 3 MPa to 6 MPa.

Surprisingly, investigations have shown that the pressure of the gas fed to the gas passage of the spray nozzle may be substantially lower than the pressure of the liquid fed to the spray nozzle and need only be slightly higher than the pressure of the gas flowing through the process chamber, in order to protect the spray nozzle adequately from adhesion of sprayed liquid and/or particles. As in the case of the pressure in the gas circulation, the pressure of the gas fed to the spray nozzle is expediently at most 80 kPa, preferably at most 50 kPa and for example at most about 30 kPa, at the latest from the beginning of the spraying of liquid and preferably during the entire period during which the gas is passed into the spray nozzle. In an advantageous further development of the process, the pressure of the gas fed to the gas passage of the spray nozzle is at most 20 kPa or even only at most 15 kPa and, for example, at most 10 kPa and, for example, at least 1 kPa greater than the pressure of the gas present in the process chamber. Accordingly, for example, a relatively small, simple and economical gas transport device may be used for transporting gas from the gas circulation to the spray nozzle. The gas transport device need increase the pressure of the gas transported by it only relatively slightly, for example by at least 1 kPa and at most 10 kPa, and accordingly consumes only a little energy. The gas transport device preferably consists of a one-stage rotary piston compressor, for example of a Roots pump. However, it should be noted that it would also be possible to provide a different gas transport device which has, for example, a turbo compressor or fan.

The process and the apparatus according to the invention are provided in particular for cases where, for the formation and/or treatment of particles, it is necessary to spray a liquid which contains an organic solvent and/or dispersant which is partly or at least almost completely evaporated in the course of the process —i.e. normally during spraying of the liquid and in any case afterwards during drying of the particles. The liquid may contain, for example, acetone, ethanol, toluene, hexane, n-pentane or a mixture of at least two of these substances. Together with air, organic solvents may form an explosive mixture. However, such a mixture can explode only if its pressure is at least equal to a minimum ignition pressure. For many commonly used organic solvents, this is in the range from about 20 kPa to about 60 kPa. In the process according to the invention and during operation of the apparatus according to the invention, the pressure of the gas is reduced to a value below the minimum ignition pressure of the solvent present or added solvent in the entire gas circulation, preferably before the beginning of the gas circulation and before a liquid containing at least one organic solvent and/or dispersant is sprayed, and is kept at this value during the entire period of the circulation of gas. In addition, the pressure of the gas fed to the spray nozzle is also preferably lower than the minimum ignition pressure during the entire period for which gas is passed into the spray nozzle or at the latest from the beginning of the spraying of liquid, so that, even in the case of unintentional, local heating of the mixture to or above its minimum ignition temperature, explosions cannot be triggered either in the gas circulation or in the spray nozzle.

The sprayed liquid may also contain water serving as the solvent and/or dispersant. In addition, particles introduced in the solid state into the process chamber may already contain at least one organic solvent and/or water.

The boiling point of an organic and/or water-containing solvent and/or dispersant is dependent on the pressure in the gas circulation and decreases with decreasing pressure. If the pressure in the process chamber is reduced to a value below the ambient air pressure, the gas temperature required for drying the sprayed particles can thus be reduced, which may be advantageous in the treatment of thermally unstable substances—such as pharmaceutical active substances which are sensitive to high temperatures. Furthermore, the reduction in the gas temperature also results in a reduction in the heat energy consumed.

During agglomeration, i.e. during the pelletization of particles, a low pressure of the gas flowing through the process chamber, below the ambient air pressure, can also make it possible for the particles, i.e. granules, formed during the pelletization to have relatively small sizes, which is desirable in certain cases.

BRIEF DESCRIPTION OF THE DRAWINGS

The subject of the invention is now described in more detail with reference to embodiments shown in the drawings. In the drawings, FIG. 1 shows a schematic apparatus with a material container having a perforated base, partly in section and partly as a view, FIG. 2 shows the spray nozzle of the apparatus on a larger scale, partly in section and partly as a view, FIG. 3 shows a section through that end section of the spray nozzle which is located at the top in FIGS. 1 and 2, on an even larger scale than in FIG. 2, and FIG. 4 shows a section through a part of the material container, which has a rotor instead of a perforated base.

DETAILED DESCRIPTION OF THE PREFERRED EMBODIMENTS

The apparatus 1 shown in FIG. 1 has a material container 3 which is in general rotationally symmetrical to a vertical axis and has a wall consisting of a plurality of parts detachably connected to one another. A gas-permeable perforated base 5 is arranged in the lower part of the container 3. The upper part of the container contains a gas-permeable filter 6. The inner space 7 of the container, which space is sealed gas-tight from the environment, is divided by the perforated base 5 and the filter 6 into three regions, namely, from bottom to top, into a gas inlet chamber 8, a process chamber 9 and a gas outlet chamber 10. The container 3 is provided with a gas inlet 11 entering the gas inlet chamber 8 and with a gas outlet 12 connected to the gas outlet chamber 10. In the process chamber 9, a hollow cylindrical sleeve 13 which is coaxial with the container axis, open at both ends and also referred to, for example, as a Wurster insert is fastened to the wall of the container 3 a small distance away from the perforated base 5 by fastening means which are not shown, in such a way that said sleeve is detachable and, for example, vertically adjustable.

The apparatus 1 has a spray device with at least one spray nozzle 15. This is fastened in the container 3 coaxially with the axis of said container and in a detachable and, for example, vertically adjustable manner. The spray nozzle 15 passes through the perforated base 5 and that end of said spray nozzle which serves for spraying a liquid projects slightly into the sleeve 13 while its connections which will be described hereinafter are present below the perforated base.

The spray nozzle shown separately in FIG. 2 and partly in FIG. 3 is in general rotationally symmetrical to an axis 16 and has a multi-part nozzle body 17. This has, at its upper end in FIGS. 1, 2 and 3, a mouthpiece 18 which possesses a cylindrical outer surface section 18*a*, a conical outer surface section 18*b* tapering away from said section 18*a* and from the remaining nozzle body 7, and, at its upper end facing away from the remaining nozzle body, a flat end surface 18*c* at right angles to the axis 16. The nozzle body 17 has a hole coaxial with the axis 16. That part of this hole which is formed by the mouthpiece 18 has, in particular from the bottom to the top, a first cylindrical section, a second, narrower cylindrical section, an upward-tapering conical section and a third cylindrical section ending at the end surface 18*c*. An annular insert serving as valve seat 19 and consisting of a plastic, namely a fluorine-containing polymer, such as polytetrafluoroethylene, is arranged in the first cylindrical section of the hole of the mouthpiece 18. Apart from any seals present, which are not shown, the remaining parts of the nozzle body 17 and in particular of the mouthpiece 18 consist of a metallic material. The nozzle body 17 is provided, at its end facing away from the mouthpiece 18, with a connector 20 which forms a liquid inlet connection 21 and a liquid outlet connection 22. The two liquid connections 21, 22 are connected with a liquid passage 23 formed by the free regions of the axial hole of the nozzle body 17. That section of the liquid passage 23 which is formed by the third, thinnest, cylindrical section of the hole of the mouthpiece 18 serves as liquid outlet 24. The liquid passage 19 is shown only in simplified form in FIG. 2 and, in the vicinity of the liquid outlet 24, may also have means for imparting angular momentum to the liquid flowing through it during operation. The first, widest, cylindrical section of the axial hole of the mouthpiece 18 could also have, for example, a sleeve-like insert which is not shown and possesses at least one coiled groove or channels which are oblique relative to the axis 16, or the like.

The valve seat 19 has a section tapering conically toward the liquid outlet 24 and, together with a pneumatic adjusting element 27 fastened to the connector 20, and a needle-like closing member 28 adjustable, namely displaceable, by said adjusting element, forms valve means 29. The needle-like closing element 28 is connected at one end to the adjusting element 27, projects from the outside, coaxially with the axis 16, through a hole in the connector 20 sealed with a gland or the like into the liquid passage 23 and possesses, in said passage, a free end section which is conical or in the form of a truncated cone. The closing element 28 is shown in FIG. 2 in its release position in which it opens the liquid passage 23. The closing element 28 can be displaced by the adjusting element 27 along the axis 16 via the intermediate position shown in FIG. 3 into a closed position in which the free end section of the closing element 28 rests on the valve seat 19 so that the closing element blocks the liquid passage 23 between the connections 22, 23 and the liquid outlet 24, fairly close to the latter.

The nozzle body 17 and its liquid passage 23 are formed, for example, similarly to known airless high-pressure nozzles. However, the spray nozzle 15 also has a sleeve 31 which is not present in known airless high-pressure nozzles and which consists of two sleeve parts 32 and 33. The one, first sleeve part 32 has an end section 32*a* which is polygonal in cross-section and fastened detachably and tightly to the nozzle body 17, namely screwed to said nozzle body, and a longer and slightly thinner, cylindrical section 32*b*. The end section 32*a* has a radial hole which is provided with an inner thread, serves as a connection for a gas pipe and forms the gas inlet 32*c* of the spray nozzle.

The cylindrical section 32*b* is detachably connected to a cylindrical section 33*a* of the other, second sleeve part 33 by threads screwed one into the other. The second sleeve part 33 is cap-shaped and has a conical section 33b, tapering away from its cylindrical section 33a, and a flat end wall 33c at right angles to the axis 16. Said end wall is separated from the end surface 18c of the mouthpiece 18 by an intermediate space and is thus a distance downstream from the liquid outlet 24 relative to the direction of flow of the liquid sprayed during the use of the spray nozzle. The end wall 33c has an outlet hole 33d which is coaxial with the axis 16 and hence with the liquid outlet 24 and is, for example, cylindrical. The circular edge or the boundary of the outlet hole 33d surrounds the edge or the boundary of the mouth of the liquid outlet 24 at a distance all round the axis 16, in a direction of view or projection parallel to the axis 16. The diameter of the outlet hole 33b is substantially larger than the diameter of the narrowest point of the liquid outlet 24 and is at least five times and preferably at least ten times the last-mentioned diameter. The diameter of the narrowest point of the liquid outlet is, for example, about 0.2 mm to 0.4 mm. The diameter of the outlet hole 33d is then, for example, about 3 mm to 8 mm. If high spray rates are intended or if the liquid to be sprayed has a very high viscosity or contains a disperse phase, the diameters of the liquid outlet and of the outlet hole can if necessary be made larger. The axial distance from the end surface 18c to that inner surface of the end wall 33c which is opposite said end surface 18c is larger than the diameter of the liquid outlet 24 and smaller than the diameter of the outlet hole 33d.

It should be noted that, in addition to the sections described, the axial hole of the mouthpiece 18 could have, at the end surface 18c, also a short, cylindrical or conical extension which is connected to the third, narrowest cylindrical hole section in the direction of flow and then, together with the narrowest, cylindrical hole section, would form the liquid outlet. Furthermore, the cylindrical outlet hole 33d could be replaced by an outlet hole which conically widens at least partly in the direction of flow. If the liquid outlet 24 and/or the outlet hole 33d are modified in this manner, the boundary—i.e. limiting surface or the limiting edge—which defines the narrowest point of the outlet hole should completely surround at a distance the boundary of the liquid outlet which defines the narrowest point of the liquid outlet and, for example, also its mouth in the axial direction of view or in projection. Furthermore, the ratios and values stated for the diameters of the liquid outlet 24 and of the outlet hole 33d should be applicable to the diameters of the narrowest points of the liquid outlet 24 and of the outlet hole 33d.

The sleeve 31, together with the nozzle body 17, bounds a gas passage 35 which connects the gas inlet 32c to the outlet hole 33d. The gas passage 35 has a section which extends from the gas inlet 32c to the cylindrical section 33a of the second sleeve part 32 and is annular in cross-section and more or less parallel to the axis 16. To said section is connected a section which is likewise annular in cross-section and is bounded on the outside by the conical section 33b of the second sleeve part 33, which section is inclined toward the axis 16 in the direction of flow. At the end surface 18c of the mouthpiece 18, the gas passage then has a short section which is bounded by the flat end surface 18c and the flat inner surface of the end wall 33c and which is more or less radial to the axis 16. The outlet hole 33d then forms both the mouth of the gas passage and an orifice for the liquid jet emerging from the liquid outlet 24 during operation.

The gas outlet 12 of the container 3 is connected to the gas inlet 11 of the container 3 by a pipe 41 and devices present between sections of said pipe. The pipe 41 contains—in sequence from the gas outlet 12 to the gas inlet 11—a shut-off and/or metering device 42 having a flap, a pressure sensor 43, a downstream dust-removing filter 44, a gas circulation device 45 consisting of a rotary piston compressor, namely a Roots pump, and an electric motor, and a heating device 46 consisting of a flow heater with a heat exchanger, and a temperature sensor 47, a filter 48 and a shut-off and/or metering device 49 having a flap. The container 3, together with the pipe 41 and the devices present therein, forms a gas circulation 51.

A suction device 55 for partial evacuation of the gas circulation 51 and for recovery of at least one solvent and/or dispersant has a pipe 56 which is connected to a first branch of the pipe 41, arranged between the downstream dust-removing filter 44 and the inlet of the gas circulation device 45, and is thus connected to the gas circulation 51. The suction device 55 has, in sequence starting at the branch of the pipe 41, a first condenser 57, a second condenser 58, a shut-off and metering valve 59, a suction pump 60 formed by a rotary vane vacuum pump and having an electric motor, and a third condenser 61 and a gas outlet 62 entering the environment. Each condenser 57, 58, 61 has a heat exchanger having a passage for a coolant and a condensate outlet which is connected via a valve 65 or 68 or 71, respectively, to the inlet of a tank 66 or 69 or 72, respectively, which is sealed from the environment. Each tank 66, 69, 72 has an outlet with a valve 67 or 70 or 73, respectively, and, together with the two valves connected to it, forms a lock. The three condensers, together with the valves connected to their condensate outlets and together with their tanks, serve as means 75 for solvent and/or dispersant recovery.

The pipe 41 has a second branch between the outlet of the gas circulation device 45 and the gas inlet 11 of the container 3 and—more precisely—between the temperature sensor 47 and the filter 48. At this branch, the gas circulation 51 is connected by a pipe 76 and a gas transport device 77 to the gas inlet 32c of the spray nozzle 15. The gas transport device 77 consists of a single-stage rotary piston compressor— namely a Roots pump—having an electric motor.

A liquid supply device 79 has a liquid reservoir 80 which is sealed from the environment and has an outlet 81 and an inlet 82. The outlet 81 is connected to the liquid inlet connection 21 of the spray nozzle 15 by a pipe 83 via a pump 84 having an electric motor and via a pulsation damper 85, the first and second connections of a three-way valve 86, a filter 87, a pressure sensor 88 and a heating device 89 which consists of a flow heater with a heat exchanger. The liquid outlet connection 22 of the spray nozzle 15 is connected to the inlet 82 of the liquid reservoir 80 by a pipe 90 via an adjustable overflow valve 91. A third connection of the three-way valve 86 is connected via a bypass pipe 92 to that section of the pipe 90 which is present between the overflow valve 91 and the inlet 82.

The various electric motors, the shut-off and/or metering devices 42, 49, the valves 59, 65, 67, 68, 70, 71, 73, 86 and possibly 91, the heat exchangers of the heating devices 46, 89, the condensers 57, 58, 61 and further devices are electrically and/or pneumatically controllable. The apparatus 1 also has a control device 94. This has electronic and pneumatic components, in particular measuring and control circuits, indicating and/or recording instruments, indicator lamps and control elements which can be manually operated. The control device 94 is connected by electric cables, which are indicated by arrows with a solid tip, to the sensors 43, 47, 88 and to other sensors not shown, to the various motors, electrically controllable adjusting elements of shut-off and metering devices and other electrically controllable members of the apparatus 1. The control device 99 is furthermore connected by pneumatic lines, which are indicated by arrows with an unshaded tip, to the pneumatic adjusting element 27 and to other pneumatic adjusting elements which are not shown.

Processes for the treatment of particles 97 with the aid of the apparatus 1 will now be described.

When the apparatus 1 is used, for example, the shut-off and/or metering devices 42, 49 are closed vacuum-tight, the material container 3 is temporarily opened and a batch of the particles 97 to be treated, for example to be provided with a coating, is introduced into the process chamber 9. Furthermore, a liquid 98 is introduced into the liquid reservoir 84 through an opening which can be closed with a cover.

If the container 3 was closed again after the introduction of the particles 101, it contains air whose pressure is approximately equal to the ambient air pressure. That part of the pipe 41 which is sealed from the container 3 by the two shut-off and/or metering devices 42, 49, and the devices present in this part of the pipe, may likewise still contain air at the ambient air pressure or—if the apparatus was evacuated and used beforehand—another gas at a lower pressure. The shut-off and/or metering devices 42, 49 are now opened again. Furthermore, the valve 59 is opened and air is sucked from the gas circulation 51 by means of the suction device 55 in a preparation and evacuation phase with the gas circulation device 45 not in operation and without fluidization of the particles 97, until the pressure in the gas circulation 51 is reduced to the intended ideal value of, for example, 10 kPa to 30 kPa. The gas present in the gas circulation and initially consisting at least to a large extent of air is then circulated in the gas circulation 51 by means of the gas circulation device 45 in the direction indicated by arrows with an unshaded tip, so that the gas flows upward from below through the container 3 and in particular through the process chamber 9 present therein. The gas flowing through the process chamber fluidizes the particles 97 so that they are moved upward through the inner space of the sleeve 13 and fall downward again outside said sleeve, as indicated by arrows with solid tips. The gas circulated in the gas circulation 51 is heated by means of the heating device 46.

At the beginning of the fluidization of the particles 97 or after a certain fluidization time, liquid 98 is sprayed continuously or intermittently into the process chamber 9 by means of the spray nozzle 15 during a spray phase, at least a part of this liquid being sprayed onto the particles 97 moved past the spray nozzle. The particles are, for example, provided with a coat. After the spray phase, the particles are dried in a drying phase, no more liquid being sprayed during the drying phase.

The control device 94 regulates the temperature of the gas circulated in the gas circulation, before and during the spray phase and in the subsequent drying phase. The temperature of the gas can be regulated, for example during the various treatment phases, to an adjustable, constant ideal value or to an ideal value which changes as a function of time according to a program. During the spray phase, the temperature of the gas circulated in the gas circulation is usually continuously or at least intermittently greater than the boiling point of the solvent and/or dispersant or solvent and/or dispersant mixture contained in the sprayed liquid 98 at the prevailing pressure and is, for example, about 40° C. to 80° C. The circulated gas can be heated during the drying phase to the same temperature as in the spray phase or to a slightly higher temperature, but one which is, for example, always less than 100° C.

During the spray phase and during the drying phase, at least a part of the solvent and/or dispersant present in the liquid which is sprayed and at least partly sprayed onto the particles vaporizes, so that superheated solvent and/or dispersant vapor is formed in the process chamber 9. This vapor has the tendency to increase the pressure measured by means of the pressure sensor 43 and the amount of gas circulated in the gas circulation. A control circuit present in the control device 94 now controls the shut-off and/or metering valve 59 and/or the suction pump 60 in such a way that the suction device 55 extracts gas from the gas circulation 51 and keeps the pressure in the latter at the intended constant ideal value or at an ideal value which may vary according to a program. The gas extracted from the gas circulation by means of the suction device 55 is cooled to a temperature of slightly more than 0° C., for example about +1° C. to +10° C., in the first condenser 57 present upstream from the suction pump 60 and hence on the vacuum side of said pump, by means of a cooling fluid passed through this heat exchanger, so that any steam present in the gas is condensed and is separated from the gas. The inner spaces of the second condenser 58, which is likewise on the vacuum side of the suction pump 60, and of the third condenser 61 present downstream from the suction pump 60 and hence on its atmosphere side are cooled to a temperature which is less than 0° C. and preferably less than −20° C., and for example up to about −40° C. The two condensers 58, 61 then condense at least the major part of the vapor of the or each organic solvent and/or dispersant present in the extracted gas. The condensates formed in the condensers are collected in the tanks 66, 69, 72 and can be discharged from said tanks from time to time. The or each solvent and/or dispersant which is present in the extracted gas and is organic and/or consists of water is thus at least substantially separated and recovered from the gas and can be reused at least in part.

The air in the gas sucked out of the gas circulation by the suction device 55 is passed into the environment. The air initially present in the gas circulation 51 is gradually replaced during spraying of liquid 98 by vapor of the or each solvent and/or dispersant present in said liquid. The gas circulated in the gas circulation consists of liquid, for example after 10 minutes of continuous spraying, and of at least 95% by volume of solvent and/or dispersant vapor by the end of the spray phase at the latest.

In certain treatments, it is advantageous or necessary for the circulated gas to consist for the most part and, for example more or less completely, of vapor of at least one organic solvent and/or dispersant at the beginning of the fluidization. For such treatments, the container 3 and that section of the gas circulation 51 which is present between the gas outlet 12 of said container and the circulation device 45, or the entire gas circulation, can be very substantially evacuated with the aid of the suction device 55, for example after the introduction of the particles 97 into the container 3 and after closing of the latter in the preparation and/or evacuation phase. An organic solvent or solvent mixture can then be introduced in the liquid state into the gas circulation, for example from the liquid reservoir 80 or from an additional reservoir and possibly through an additional inlet, and can be evaporated in said gas circulation, or can be introduced in the form of a vapor into the gas circulation. The amount of this vapor may be, for example, such that the desired pressure is obtained in the gas circulation. If the air content of the gas present in the gas circulation is sufficiently low, fluidization of the particles can be started. If necessary, gas may be sucked out of the gas circulation again before the beginning of fluidization and solvent introduced into said gas circulation.

Another possibility is first to flush the container and if necessary the entire gas circulation with nitrogen or with another inert gas after closing the container, before the gas is sucked out of the gas circulation and before the particles are fluidized.

When the treatment of the particles 97 is complete, i.e. when they have been provided with a coating by spraying and have then been dried, the shut-off and/or metering devices 42, 49 are closed, the container 3 is temporarily opened, the treated particles are removed from said container and, for example, a further batch of particles is introduced into the container.

Some details concerning the supply and spraying of liquid will now be described. After the liquid 98 has been filled into the liquid reservoir 80 and when the pump 84 is started, the three-way valve 86 is temporarily brought into a position in which it connects the outlet of the pump 84 via the bypass line 92 to the liquid reservoir 80, so that the pump 84 consisting, for example, of a membrane pump, does not have to overcome a high opposite pressure or flow resistance and is rapidly filled. The three-way valve 86 is then brought into the position in which it connects the pump 84 to the filter 87. During the spray phase with continuous or intermittent spraying of liquid and also possibly during the drying phase and during changing of particle batches, the pump 84 continuously pumps liquid 98 from the liquid reservoir 80 into the liquid passage 23 of the spray nozzle 15. In addition, the liquid pumped to the spray nozzle 15 is heated in the heating device 89.

If the pump 84 pumps liquid but it is not intended to spray any liquid, the needle-like closing member 28 is brought to its closed position. The liquid pumped by the pump 84 into the spray nozzle 15 then builds up in the liquid passage 23 of the spray nozzle a pressure which is determined by the overflow valve 91 and is, for example, adjustable directly and manually on said valve or by means of the control device 94. When the pressure in the liquid passage 23 reaches the intended value of, for example, 3 MPa to 6 MPa, the liquid flows via the pipe 90 and the overflow valve 91 back into the liquid reservoir 80.

Figure 1:
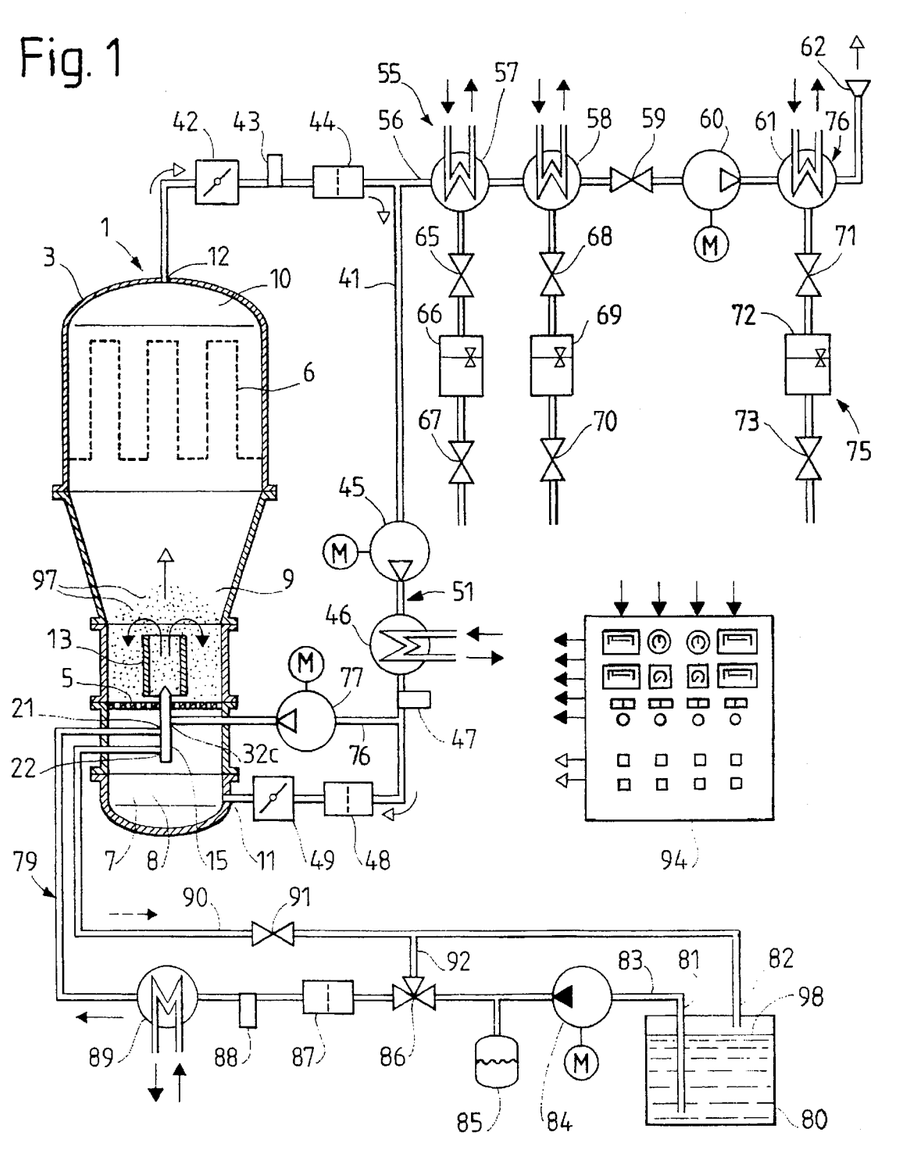
Figure 2:
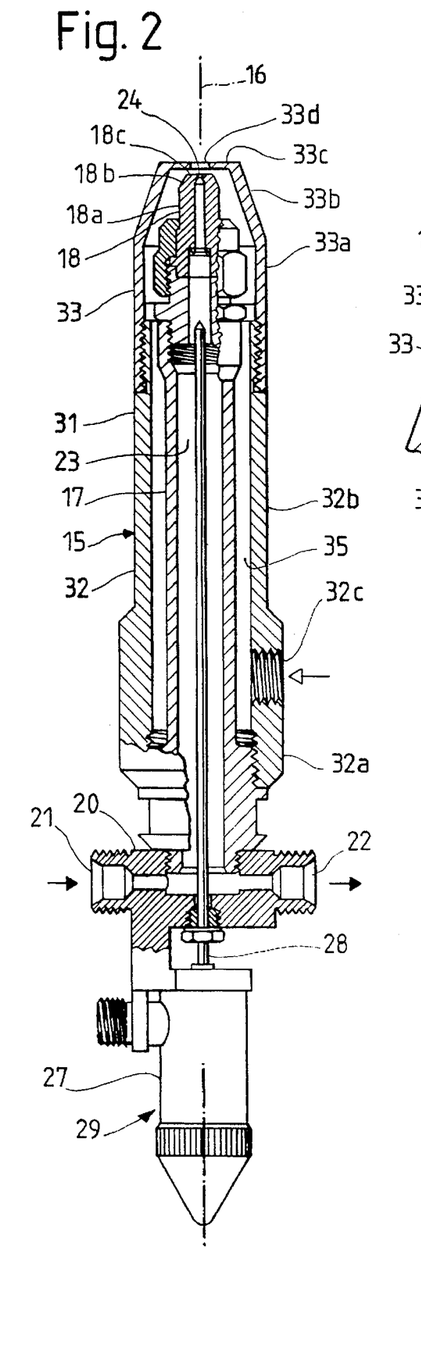
Figure 3:
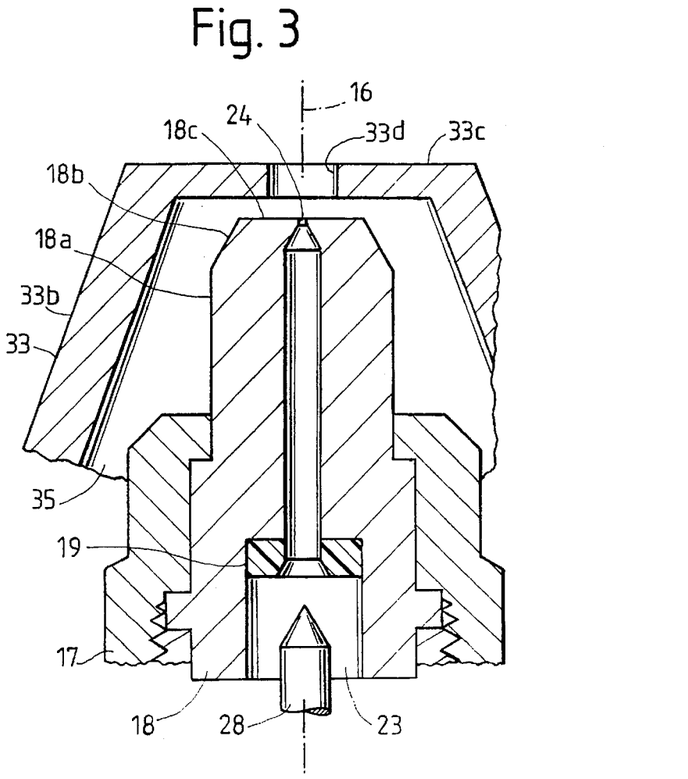

If it is intended to spray liquid, the closing member 28 is moved to the open position shown in FIG. 2. The volume of that section of the liquid passage 23 which is present between the closable valve seat 19 and the liquid outlet 24 is substantially smaller than the volume of the remaining part of the liquid passage and also than the volume of that part of the pipe 83 which is present between the outlet of the pump 84 and the spray nozzle and of the devices present in this part of the pipe. Since the liquid passage 23 was supplied with liquid under pressure before the beginning of spraying—i.e. with closing member 28 still in the closed position—the liquid at the full, intended spray pressure very rapidly reaches the liquid outlet 24 of the spray nozzle at the beginning of spraying. The pump 84 can supply the spray nozzle 15 with, for example, an amount of liquid per unit time which is slightly greater than the amount of liquid sprayed through the liquid outlet 24 when closing member 28 is in the open position, so that, even during spraying, the liquid in the liquid passage 23 has the pressure determined by the overflow valve 91, and the excess liquid flows via the overflow valve back into the liquid reservoir 80.

When emerging from the liquid outlet 24 of the spray nozzle 15, the sprayed liquid forms a liquid jet coaxial with the axis 16. Said jet passes through the outlet hole 33d of the sleeve 31 into the free inner space of the sleeve 13 and hence into the inner space of the process chamber 9. The liquid jet preferably has a shape of a hollow cone, forms a cohesive liquid film on emerging from the liquid outlet and then separates into droplets.

In the gas circulation 51, a pressure gradient which is caused in particular by the filter 48, the shut-off and/or the metering device 49 and the perforated base 5 and which is dependent on the amount of gas circulated per unit time and on the position of the flap of the device 49 and is, for example, about 1 kPa to about 4 kPa is formed between that branch of the pipe 41 which is connected to the inlet of the gas transport device 77 and the process chamber 9. When liquid is sprayed, the gas transport device 77 controlled with the aid of the control device 84 transports gas from that section of the gas circulation 51 which is present between the outlet of the heating device 46 and the shut-off and/or metering device 49 to the gas inlet 32c of the spray nozzle 15. The gas transport device 77 also slightly compresses the gas transported by it and increases its pressure by, for example, about 5 kPa to 6 kPa. The pressure of the gas transported by the gas transport device 77 in the gas passage 35 of the nozzle is greater, by a pressure difference, than the pressure of the gas flowing through the process chamber in the vicinity of the spray nozzle 15. The stated pressure difference is equal to the sum of the stated pressure gradient formed in a section of the gas circulation and the pressure increase produced by the gas transport device 77 and is accordingly about 6 to 10 kPa.

The gas fed to the spray nozzle 15 flows in the gas passage 35 initially more or less along the axis 16, approaches the latter between the end surface 18c and the end wall 33c and then flows together with the liquid jet out of the outlet hole 33d. This gas surrounds the mouthpiece 18 at the liquid outlet 24 and then the liquid jet in the region of the outlet hole 33d and in that region of the free inner space of the process chamber 9 which is in the vicinity of said hole, in a cross-section at right angles to the axis 16. The gas flowing through the spray nozzle and out of the latter therefore shields the outer surfaces of the nozzle body 17 and in particular the outer surfaces of its mouthpiece 18 and also the various surfaces of the sleeve 31 from the sprayed liquid. In spite of its relatively low pressure, the gas flowing out of the outlet hole 33d thus prevents liquid droplets in the environment of the liquid outlet 24 from coming into contact with the outside of the mouthpiece 18 or of the sleeve 31 and adhering to mouthpiece 18 or to the sleeve 31 and drying. However, it should be noted that the atomization of the liquid is effected essentially by the pressure of the liquid and that—in contrast to a conventional multi-medium nozzle—the gas flowing through the spray nozzle has very little or no effect on the atomization, apart from the shielding effect described, and in particular also has virtually no effect on the sizes of the droplets.

As already mentioned, during the spray phase liquid can be sprayed either continuously or intermittently. In the latter case, the gas transport device 77 transports gas to the spray nozzle 15, for example also during the time intervals between successive spray processes, and said gas then flows out through the outlet hole 33d without liquid.

As in the case of the gas flowing through the sleeve 13 and the particles 97 present therein, the liquid sprayed out of the outlet hole 33d during a spray process has an upward-pointing velocity component parallel to the axis 16 and is thus generally sprayed cocurrent to the gas flowing through the sleeve 13 and the particles 97. During spraying of liquid, the gas flowing out of the outlet hole 33d of the spray nozzle 15 also substantially prevents sprayed particles 87 from adhering to the spray nozzle. Furthermore, the stated gas may also help to ensure that no liquid, or at most little liquid, reaches the inner surface of the sleeve 13.

The particles 97 introduced into the container may contain, for example, at least one pharmaceutical active substance—for example the active substance theophylline used for various studies—and possibly at least one excipient—such as, for example, starch and/or mannitol. For the formation of a pore-free coat which is resistant to gastric fluid and does not dissolve until it reaches the intestine, the sprayed liquid 98 which is sprayed onto the particles 97 can consist, for example, of a solution which contains an organic solvent mixture comprising 60% by volume of acetone and 40% by volume of ethanol and a polymer dissolved in this solvent mixture, such as, for example, Eudragit L100 (producer: Röhm Pharma, Weiterstadt, Germany).

If the particles are to be provided with a coat which ensures delayed release of active substance in the intestine, the liquid 98 sprayed may be, for example, a solution which contains an organic solvent mixture comprising 80% by volume of toluene and 20% by volume of ethanol and, as the polymer, dissolved ethylcellulose, which is obtainable under the name Ethocel Standard 10 Premium from Dow Chemical, Midland, U.S.A. A dispersion which contains a dispersant, consisting at least partly of water, and a disperse phase of latex and ethylcellulose can also be sprayed for the formation of an ethylcellulose coat. The ethylcellulose solution or dispersion may also contain at least one plasticizer, such as dibutyl sebacate and/or dibutyl phthalate.

For example, a polyvinylpyrrolidone solution (PVP solution) can be sprayed for the formation of a porous coat. Polyvinylpyrrolidone is available under the name Kollidon K25 from BASF AG, Ludwigshafen, Germany, and can optionally be dissolved in water or in an organic solvent.

Furthermore, a hydroxypropylmethylcellulose phthalate solution (HPMCP solution) can be sprayed onto the particles in order to form a porous coat thereon. The company Shin-Etsu Chemical, Tokyo, Japan, supplies various HPMCP modifications which are water-soluble above various pH values.

The apparatus 1 can also be used for the agglomeration of particles, in which case the sleeve 13 is preferably removed or omitted. The spray nozzle could then be arranged above the fluid bed formed by the particles when the latter are fluidized, in such a way that said nozzle sprays the liquid downward. Furthermore, a plurality of spray nozzles may be provided.

For the agglomeration of particles, it is possible to spray a binder solution which contains at least one organic solvent and/or water serving as a solvent. If the particles to be agglomerated already contain a binder present in the solid state, a liquid which consists exclusively of one or more organic and/or aqueous solvent(s) and in which the binder is soluble may be sprayed. It is also possible first to agglomerate the particles originally present and then to provide the resulting agglomerated and/or granular particles with a coat.

Figure 4:
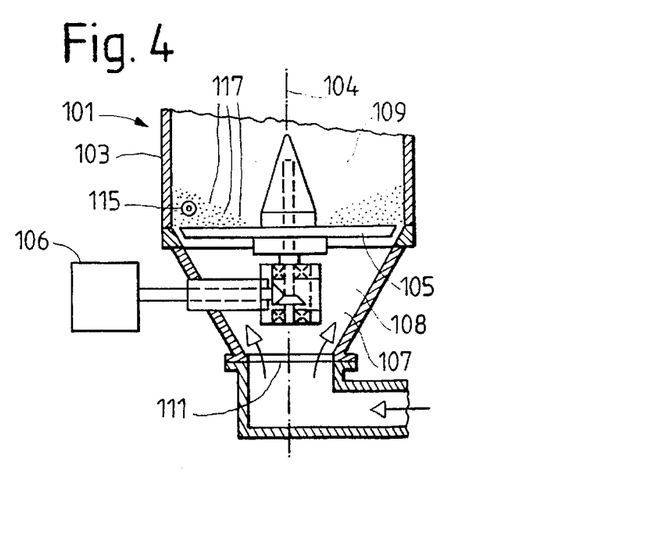

The apparatus 101 shown in FIG. 4 has a material container 103 with a vertical axis 104 instead of the perforated base 5 of the container 3, the container 103 contains a rotor 105 which is adjustable along the axis 104 and rotatable about said axis and which has a flat disk as the main component and can be rotated by means of a drive device 106 which is arranged outside the container 103 and has an electric motor, via a miter gear arranged below the disk of the rotor 105. The inner space 107 of the container 101 is tightly sealed from the environment and has a gas inlet chamber 108, present below the rotor disk, and a process chamber 109 adjacent to the upper side of the rotor. In addition, the container 103 has a gas inlet 111 entering the gas inlet chamber 108 and a gas outlet present at the upper end of the container, which end is not visible. Furthermore, at least one spray nozzle 115 is present. This projects slightly above the disk of the rotor 105 into the process chamber 109 and is arranged horizontally so that, at its end serving for spraying of liquid, its axis is approximately tangential to a circle coaxial with the axis 104. Otherwise, the spray nozzle 115 is similar to the spray nozzle 15.

The apparatus 101 has a gas circulation which is formed partly by the container 103 and has a gas circulation device, a suction device, a gas transport device and a liquid supply device. These parts of the apparatus 101 are formed and connected to one another and to the spray nozzle 115 similarly to the corresponding parts of the apparatus 1.

When the apparatus 101 is used, a batch of particles 117 is introduced into the process chamber 109 and gas is then sucked out of the gas circulation by means of the suction device so that the pressure in the gas circulation is reduced, for example, to 5 kPa to 30 kPa. Furthermore, the rotor 115 is raised so that its disk previously resting against the wall of the container 103 occupies the position shown in FIG. 4, in which an annular gap is present between the wall of the container and the disk. Moreover, gas is circulated in the gas circulation by means of a gas circulation device so that this gas flows into the gas inlet chamber 108 and then upward through the stated annular gap and the process chamber 109 to the gas outlet. In addition, the rotor 105 is simultaneously rotated. Some of the particles 117 then rest on the rotor and are moved outward by the latter around the axis 104 and by the resulting centrifugal force. When the particles reach a space present in the vicinity of the annular gap, they are lifted up by the upward-flowing gas and fluidized to a greater or lesser extent. The spray nozzle 115 projects into the bed formed by the particles. During movement of the particles, liquid is sprayed during a spray phase by means of the spray nozzle continuously or intermittently into the particle bed and sprayed onto the particles. Furthermore, the gas transport device simultaneously transports gas from the gas circulation to the spray nozzle. This gas then emerges, together with the sprayed liquid, from the outlet hole of the spray nozzle 115. The particles 117 can be provided with a coat and/or agglomerated in the spray phase and then dried in a drying phase. Unless stated otherwise above, the treatment of the particles 117 by means of the apparatus 101 is carried out similarly to the treatment of the particles 97 by means of the apparatus 1, the advantages also being similar.

The apparatuses and processes can also be modified in other ways.

As already mentioned, the cylindrical outlet hole 33d of the sleeve of the spray nozzle could be replaced by an outlet hole which at least partly widens conically outward. Furthermore, the flat outer surface of the end wall 33c could be replaced by a surface which has a continuous joint with the outer surface of the conical section 33b of the second sleeve part 33, is conical and/or convex in axial section and extends at least almost to the outer edge of the outlet hole of the sleeve of the spray nozzle.

Furthermore, the apparatuses may be provided with means for continuously introducing the particles into the process chamber and removing them therefrom. For example, gas at a pressure of 5 kPa to 30 kPa can then be circulated in the gas circulation and a solution whose droplets form particles after drying can be sprayed into the process chamber. After drying and/or after an additional treatment in which they are provided with a coat and/or agglomerated, said particles could then be transported continuously via a lock and out of the process chamber.

Moreover, it is even possible to replace the gas transport pump 77 by a connecting pipe or a metering valve and also to provide a throttle between the branch connected to the gas transport device 77 and the gas inlet 11 of the container 3. Said throttle, together with the filter 48, the shut-off and/or metering device 49 and the perforated base 5, can then generate a pressure gradient which is so great that a sufficient amount of gas flows out of the pipe 41 to the gas inlet of the spray nozzle without gas transport device 77. An analogous modification is also possible in the case of the apparatus 101.

What is claimed is:

1. A process for at least one of producing and of treating particles within a process chamber, including the steps of circulating gas in a gas circulation that includes a process chamber and a gas circulation device, feeding a liquid, during circulation of gas, at least from time to time to at least one spray nozzle and spraying the liquid into the process chamber through a liquid outlet present in a mouthpiece of the spray nozzle, the process further comprising the steps of, moving the particles within the process chamber, withdrawing the gas, at least from time to time, from the gas circulation by a suction device so that the pressure in the process chamber is continuously at a value of at most 50 kPa at least during spraying of liquid;

feeding the liquid to the spray nozzle at a pressure of at least 500 kPa for atomizing the liquid;

wherein, at least during the spraying of liquid, passing gas from the gas circulation to a gas passage of the spray nozzle, said gas passage having a section which, in cross-section surrounds the mouthpiece, and passing the gas into the process chamber through the gas passage, wherein the pressure of the gas fed to the gas passage of the spray nozzle is at most 20 kPa greater than the pressure of the gas present in the process chamber, wherein the gas streaming through the gas passage into the process chamber forms a gas envelope for shielding the spray nozzle at least substantially against contact with the atomized liquid.

2. A process as claimed in claim 1, wherein, during spraying, the liquid forms a hollow cone in the space adjacent to the liquid outlet.

3. A process as claimed in claim 1, wherein the pressure of the gas fed to the gas passage of the spray nozzle is at most 10 kPa greater than the pressure of the gas present in the process chamber.

4. A process as claimed in claim 1, wherein the circulated gas is brought, at least from time to time, to a temperature at which at least a part of the liquid is converted into vapor.

5. A process as claimed in claim 1, wherein the sprayed liquid contains at least one of an organic solvent and of an organic dispersant, wherein the gas circulated in the gas circulation is brought, at least temporarily, to a temperature at which the at least one of an organic solvent and of an organic dispersant contained in the sprayed liquid is converted into vapor, wherein gas is withdrawn, at least from time to time, from the gas circulation by means of a suction device so that, from the beginning of the spraying of liquid at the latest until the end of the circulation of gas, the pressures of the gas circulated in the gas circulation and of the gas passed into the gas passage of the spray nozzle at least during spraying of liquid are lower than a minimum ignition pressure at which a mixture of air and vapor of the at least one of an organic solvent and of an organic dispersant present in the sprayed liquid can be caused to explode, and wherein at least one of an organic solvent vapor and of an organic dispersant vapor present in the gas withdrawn from the gas circulation is condensed and then collected in the liquid state.

6. A process as claimed in claim 1, wherein the process chamber is bounded by a container having a gas inlet connected to the process chamber and a gas outlet connected to the process chamber, wherein the withdrawal of gas from the gas circulation is effected at a branch thereof which is located between the gas outlet of the container and the gas circulation device and wherein the gas passed to the spray nozzle is withdrawn from the gas circulation at a branch which is located between the gas circulation device and the gas inlet of the container.

7. A process as claimed in claim 1, wherein the gas circulated by the gas circulation device in the gas circulation is passed upward from below through the process chamber, wherein, during spraying of liquid, the particles are moved by at least one of fluidization by the circulated gas and a rotor bounding the process chamber at its lower end and wherein the gas passed from the gas circulation to the spray nozzle is transported by a gas transport device between the gas circulation and the gas passage of the spray nozzle.

8. A process as claimed in claim 7, wherein the gas transport device increases the pressure of the gas transported by it by at most 10 kPa.

9. A process as claimed in claim 7, wherein the gas transport device increases the pressure of the gas transported by it by at least 1 kPa.

10. A process as claimed in claim 1, wherein the pressures of the gas in the entire gas circulation and in the gas passage of the spray nozzle are kept continuously at said value of at most 50 kPa at least during spraying of liquid and therewith during passing gas through the gas passage of the spray nozzle.

11. A process according to claim 1, wherein the pressure of the gas in the entire gas circulation is kept continuously at said value of at most 50 kPa at latest from the beginning of spraying of liquid until the end of the circulation of gas.

12. A process as claimed in claim 1, wherein the pressure of the gas in the entire gas circulation is kept continuously at a value of at most 30 kPa at least during spraying of liquid and therewith at least during passing of gas through the gas passage of the spray nozzle.

13. A process for at least one of producing and of treating particles within a process chamber, including the steps of circulating gas in a gas circulation that includes a process chamber and a gas circulation device, feeding a liquid, during circulation of gas, at least from time to time to at least one spray nozzle and spraying the liquid into the process chamber through a liquid outlet present in a mouthpiece of the spray nozzle, the process further comprising the steps of, moving the particles within the process chamber;

feeding the liquid to the spray nozzle at a pressure of at least 500 kPa;

wherein, at least during spraying of liquid, passing gas from the gas circulation to a gas passage of the spray nozzle, said gas passage having a section which, in cross-section surrounds the mouthpiece, and passing the gas into the process chamber through a section of the gas passage, wherein the pressure of the gas fed to the gas passage of the spray nozzle is at most 20 kPa greater than the pressure of the gas present in the process chamber, wherein the gas streaming through the gas passage into the process chamber forms a gas envelope for shielding the spray nozzle at least substantially against contact with the atomized liquid;

wherein the sprayed liquid contains at least one of an organic solvent and of an organic dispersant, wherein the gas circulated in the gas circulation is brought, at least temporarily, to a temperature at which the at least one of an organic solvent and of a dispersant contained in the sprayed liquid is converted into vapor; and withdrawing gas, at least from time to time, from the gas circulation by means of a suction device so that, at least during spraying of liquid, the pressures of the gas circulated in the gas circulation and of the gas passed into the gas passage of the spray nozzle, at least during spraying of liquid, are below the ambient air pressure and lower than a minimum ignition pressure at which a mixture of air and vapor of the at least one of an organic solvent and of an organic dispersant present in the sprayed liquid can be caused to explode.

14. A process as claimed in claim 13, wherein the at least one of an organic solvent vapor and of an organic dispersant vapor present in the gas withdrawn from the gas circulation is condensed and then collected in the liquid state.

15. A process as claimed in claim 13, wherein the gas circulated in the gas circulation and passed through the gas passage of the spray nozzle consists at least at the termination of spraying of liquid at least to the largest part of the at least one of an organic solvent and of an organic dispersant.

16. A process as claimed in claim 13, wherein the gas circulated by the gas circulation device in the gas circulation is passed upward from below through the process chamber, wherein, during spraying of liquid, the particles are moved by at least one of fluidization by the circulated gas and a rotor bounding the process chamber at its lower end and wherein the gas passed from the gas circulation to the spray nozzle is transported by a gas transport device between the gas circulation and the gas passage of the spray nozzle, wherein the gas transport device increases the pressure of the gas transported by it by at most 10 kPa.

17. A process for at least one of producing and of treating particles within a process chamber, including the steps of circulating gas in a gas circulation that includes a process chamber and a gas circulation device, feeding a liquid, during circulation of gas, at least from time to time to at least one spray nozzle and spraying the liquid into the process chamber through a liquid outlet present in an end of a mouthpiece of the spray nozzle, the process further comprising the steps of, moving the particles within the process chamber;

withdrawing the gas, at least from time to time, from the gas circulation by a suction device so that the pressure in the process chamber is continuously at a value of at most 50 kPa at least during spraying of liquid;

feeding the liquid to the spray nozzle at a pressure of at least 500 kPa for atomizing the liquid;

wherein the spray nozzle defines an axis and has a sleeve, wherein the sleeve has an end wall which is located along the axis a distance away from said end of the mouthpiece and has an outlet hole coaxial with the liquid outlet and has further an inner surface which is opposite to the mouthpiece, flat and at right angles to the axis, wherein the boundary of the narrowest part of the outlet hole surrounds the boundary of the narrowest point of the liquid outlet at a distance all around the axis in a direction of view parallel to the axis, wherein the spray nozzle has a gas passage having a section which is bounded by the sleeve and the mouthpiece and, in cross-section, encompasses the mouthpiece;

wherein, at least during the spraying of liquid, passing gas from the gas circulation to the gas passage of the spray nozzle at a pressure which is at most 20 kPa greater than the pressure of the gas present in the process chamber; and passing the gas fed to the gas passage of the spray nozzle through said section of the gas passage, whereby the gas flows towards the axis between the end of the mouthpiece and said flat, inner surface of the sleeve and then through said outlet hole into the process chamber so that the gas streaming through the gas passage into the process chamber forms a gas envelope for shielding the spray nozzle at least substantially against contact with the atomized liquid.

18. A process as claimed in claim 17, wherein the mouthpiece has a flat end surface which encompasses the liquid outlet, is at right angles to the axis and partly opposite to said flat, inner surface of the end wall.

19. A process as claimed in claim 17, wherein the sleeve has an inner surface which tapers toward the flat inner surface and is connected at its narrower end with the flat inner surface of the end wall.

20. A process as claimed in claim 17, wherein the pressure of the gas fed to the gas passage of the spray nozzle is at most 10 kPa greater than the pressure in the process chamber.

21. A process as claimed in claim 17, wherein the pressure in the process chamber is maintained at said value of at most 50 kPa at latest from the beginning of spraying liquid until the end of the circulation of gas.

22. An apparatus for at least one of the production and of the treatment of particles comprising, a process chamber for receiving the particles;

a gas circulation device forming a gas circulation together with the process chamber to circulate gas through the gas circulation and the process chamber;

a suction device connected to the gas circulation to extract gas from the gas circulation;

a pressure sensor for measuring the pressure in the gas circulation;

a control device connected to the pressure sensor and to the suction device;

at least one spray nozzle for spraying a liquid into the process chamber, said spray nozzle including a mouthpiece and a liquid passage with a liquid outlet bounded by the mouthpiece, wherein the spray nozzle has a gas passage with a section which, in cross-section, surrounds the mouthpiece at the liquid outlet;

a liquid supply device connected to the spray nozzle for supplying a liquid to said spray nozzle at a pressure of at least 500 kPa;

wherein said control device including means to control the suction device so that the pressure in the process chamber is at a value of at most 50 kPa at least during the spraying of liquid;

means for feeding a gas from the gas circulation to the gas passage of the spray nozzle at a pressure which is at most 20 kPa greater that the pressure in the process chamber and for passing this gas through the gas passage into the process chamber so that the gas streaming through the gas passage into the process chamber forms a gas envelope for shielding the spray nozzle at least substantially against contact with the atomized liquid.

23. A process as claimed in claim 22, wherein the spray nozzle defines an axis and has a sleeve which, together with the mouthpiece, bounds said section of the gas passage, wherein said sleeve has an end wall which is located downstream of the liquid outlet and a distance away from the mouthpiece relative to the direction of flow of the liquid flowing through the liquid outlet when the spray nozzle is in use, and has an outlet hole coaxial with the liquid outlet, and wherein the boundary of the narrowest point of the outlet hole surrounds the boundary of the narrowest point of the liquid outlet at a distance all around the axis in a direction of view parallel to the axis of said liquid outlet.

24. An apparatus as claimed in claim 23, wherein the liquid outlet and the outlet hole of the sleeve are circular in a direction of view parallel to the common axis of the liquid outlet and of the outlet hole and wherein the diameter of the narrowest point of the outlet hole is at least five times the diameter of the narrowest point of the liquid outlet.

25. An apparatus as claimed in claim 22, wherein said means for feeding includes a gas transport device connecting the gas circulation to the gas passageway of the spray nozzle.

26. An apparatus as claimed in claim 25, wherein the gas transport device is formed by a one-stage rotary piston compressor.

27. An apparatus as claimed in claim 25, wherein the gas transport device is formed by a Roots pump.

28. An apparatus as claimed in claim 22, wherein a container which bounds the process chamber and has a gas inlet connected to the process chamber and a gas outlet connected to the process chamber is present, wherein the suction device is connected to the gas circulation at a branch of the gas circulation which is arranged between the gas outlet of the container and the gas circulation device and wherein the gas transport device is connected to the gas circulation at a branch of the gas circulation arranged between the gas circulation device and the gas inlet of the container.

29. An apparatus as claimed in claim 22 wherein said suction device includes means for recovery of one of the solvent and dispersant.

30. An apparatus as claimed in claim 22, wherein said mouthpiece has an end defining said liquid outlet and wherein the end wall of the sleeve has an inner surface which is opposite to said end of the mouthpiece, spaced from the latter along an axis of said spray nozzle, flat and at right angles to the axis.

31. An apparatus as claimed in claim 30, wherein said end of the mouthpiece has a surface which is flat, at right angles to the axis and partly opposite to said flat, inner surface of the sleeve.

32. An apparatus as claimed in claim 30, wherein said sleeve has an inner surface which tapers towards the flat, inner section, is connected therewith at the narrower end of the tapering surface and bounds together with the mouthpiece a part of the gas passage.

* * * * *